W. T. & J. O. WISE.
HAY FEEDING APPARATUS.
APPLICATION FILED MAY 11, 1908.
906,670.
Patented Dec. 15, 1908.
2 SHEETS—SHEET 1.
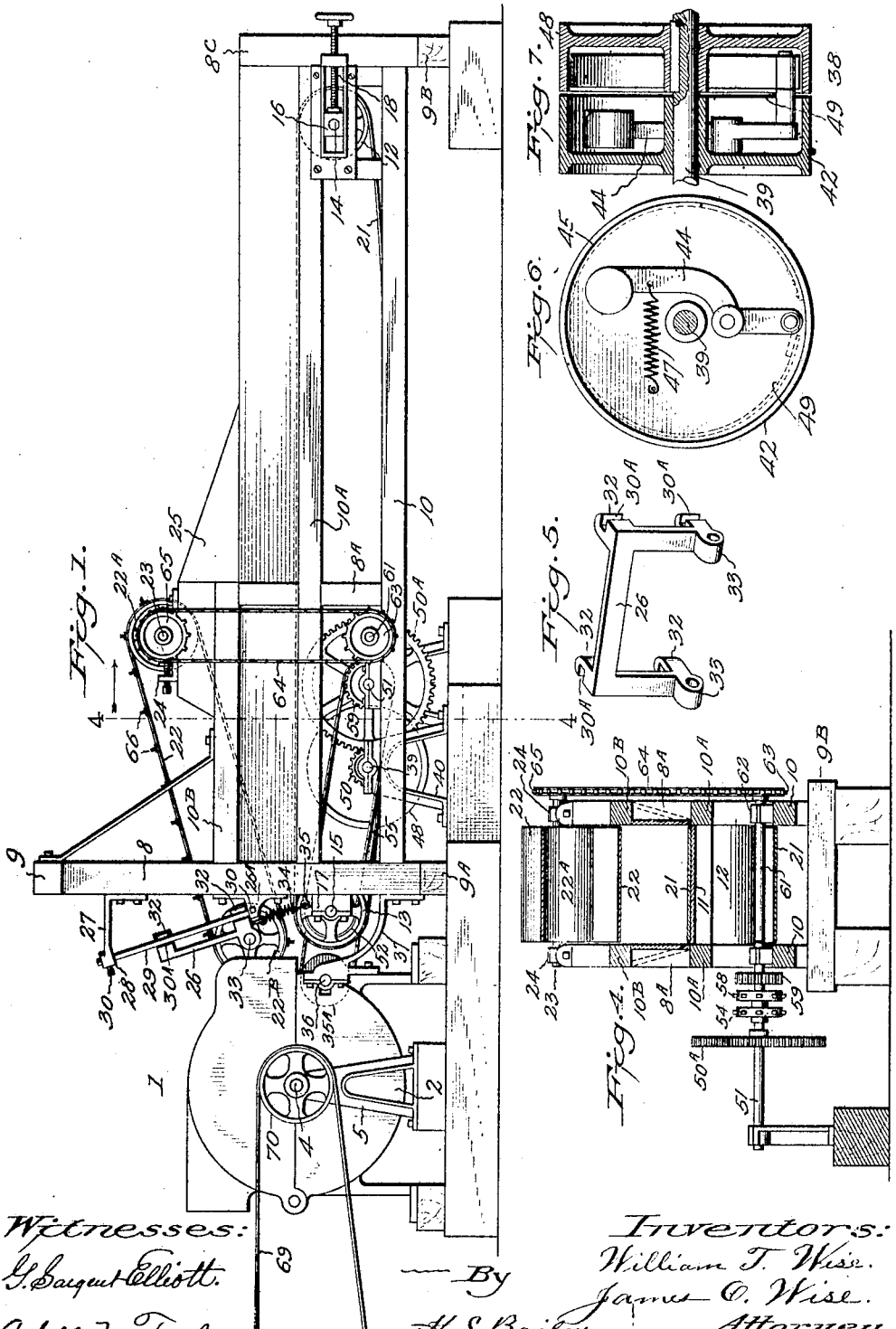
Witnesses:
G. Sargent Elliott
Adella M. Fowle
Inventors:
William T. Wise
James O. Wise
By H. S. Bailey
Attorney

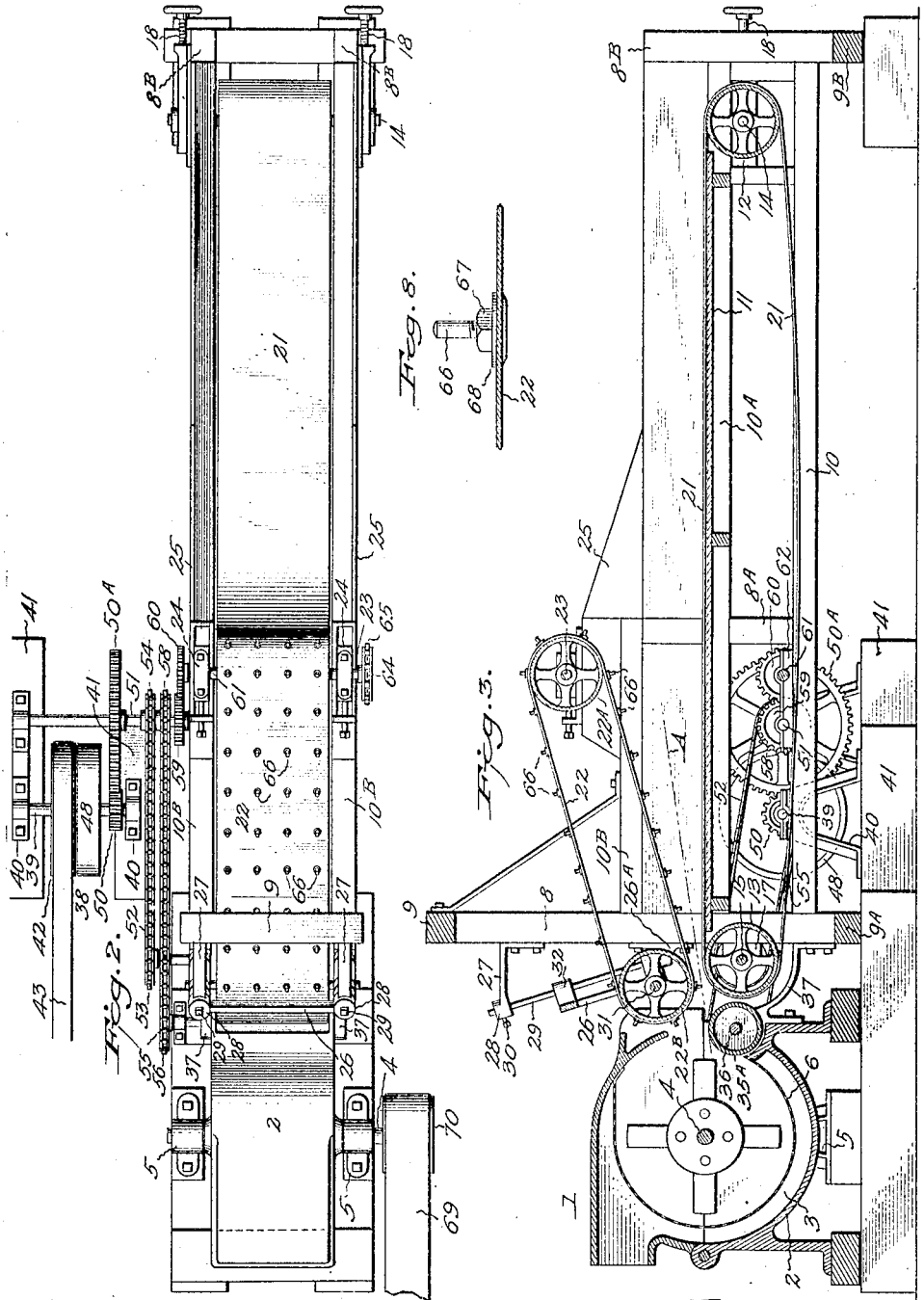

UNITED STATES PATENT OFFICE.

WILLIAM T. WISE AND JAMES O. WISE, OF CANFIELD, COLORADO.

HAY-FEEDING APPARATUS.

No. 908,670.          Specification of Letters Patent.          Patented Dec. 15, 1908.

Application filed May 11, 1908. Serial No. 432,213.

*To all whom it may concern:*

Be it known that we, WILLIAM T. WISE and JAMES O. WISE, citizens of the United States of America, residing at Canfield, county of Boulder, and State of Colorado, have invented a new and useful Hay-Feeding Apparatus, of which the following is a specification.

Our invention relates directly to alfalfa hay feeding machinery, and in general to any kind of hay or straw feeding and chopping and pulverizing machinery; and the object of our invention is: To provide an even, constant, continuous, alfalfa hay feeding machine for feeding alfalfa and other hay and straw in a proper manner to chopping and pulverizing machines. We attain this object by the mechanism illustrated in the accompanying drawings, in which:

Figure 1, is a side elevation of the improved device for feeding alfalfa or other material to chopping machines. Fig. 2, is a plan view of the same. Fig. 3, is a central vertical, longitudinal sectional view through the machine. Fig. 4, is a transverse, vertical sectional view on the line 4—4 of Fig. 1. Fig. 5, is a perspective view of the saddle in which the lower roller of the inclined feed belt is journaled. Fig. 6, is a front elevation of a pulley or belt wheel supplied with a form of governor used in connection with our device. Fig. 7, is a vertical, sectional view through the belt wheel and governor. And Fig. 8, is an enlarged, sectional view through a fragment of the feed belt, showing the arrangement of the feed pins.

Similar letters of reference refer to similar parts throughout the several views.

Referring to the drawings, the numeral 1, designates a hay chopping and pulverizing machine of any suitable type, which does not in itself form any part of our invention. It consists of a frame 2, provided with a circular hollow chamber or cage 3, in the axial center of which a shaft 4, is rotatably mounted on suitable bearings 5; upon the shaft a plurality of hammer hay cutting breaking and pulverizing knives or cutters, which may be of any suitable form of construction and arrangement, are revolubly mounted: between the rotary path of the cutters and the peripheral wall of the frame, a screen 6, is positioned, and the hay is pulverized until it passes through the meshes of this screen and into the space back of it, from which it is forced through a delivery pipe, which conveys it to a suitable storage bin, from which the pulverized feed is sacked and sold for feed for stock, as it forms a valuable feed for cattle, hogs, sheep, and horses.

Our invention contemplates a hay feeding machine in connection with which the chopper and pulverizer is simply a coöperating element in the process of making alfalfa meal. To this end our invention comprises and contemplates an alfalfa chopping and pulverizing machine of any suitable type and of any suitable construction, and an alfalfa feeding machine that will receive alfalfa from a farm wagon and convey it to and feed it regularly into the chopping and pulverizing arms or hammer knives of the chopping and pulverizing machine. To this end our feeder comprises a wooden trough shaped frame, which is long enough to extend from the chopper to a part of the mill where alfalfa can be unloaded from a farm wagon or from a bin directly into its receiving end, and this trough shaped frame comprises side standards 8, 8$^A$ and 8$^B$, cross braces 9, 9$^A$, and 9$^B$, and longitudinal tie beams 10, 10$^A$ and 10$^B$. A floor 11 is laid flush the tops of the longitudinal tie beams 10$^A$, and across them from one side of the frame to its opposite side, and at the opposite ends of the frame rollers 12 and 13 are mounted on shafts 14 and 15, which are journaled in boxes 16 and 17. The pulley 12 is placed inside of the receiving end of the feeder, and its shaft boxes are supported in slide-ways which are secured between the longitudinal ties 10 and 10$^A$; the boxes that support the shaft of the pulley 12 are of a type that is provided with adjustable connections 18, which permits the pulley to be moved longitudinally of the length of the feeder a few inches. The pulley 13 is preferably placed a few inches beyond the discharging end of the feeder, and its shaft 15 is journaled in the bracket boxes 17, which are secured to the discharging end standards 8 of the feeder. Upon these pulleys a canvas or other suitable fabric belt 21 is mounted, the bottom of the top half of which runs along close to and bears under a load on the floor 11 of the feeder. From the alfalfa receiving end of the feeder to within a few feet of the discharging end of the feeder, we preferably use but two longitudinal side ties, which are framed to the standards, and this portion of the feeder is lower than the discharging end portion of it, which is built up higher from the standard 8^A to the end standards 8, three longitudinal ties, which are spaced at preferably equal distances apart, being employed at this discharging end portion of the feeder.

22 designates an inclined belt, which is preferably made of canvas or other suitable fabric. This belt we term the feeder belt, and its front end is journaled above the upper tie 10^B close to the standard 8^A, while the opposite end of this feeder belt extends downwardly between the side ties and standards towards and projects beyond the discharging end of the feeder and beyond the end of the floor belt a short distance. The upper end is mounted on a pulley 22^A, which is secured on a shaft 23, that is journaled in slidable adjustable boxes 24, which are secured to blocks on the top of the ties 10^B, and the lower end of the belt is supported on a pulley 22^B. From the ends of the boxes 24, diverging side boards 25 extend down to the top edges of a pair of side boards that extend upward from the side ties 10^A, along them from the alfalfa receiving end of the feeder to the side standard 8^A. The lower end of this inclined feeder belt is automatically adjustable in a substantially vertical plane on a saddle 26, which is mounted to slide reciprocally on slide-ways attached to the discharge end of the feeder. This feature of our invention can be carried out in any manner, it being only necessary to support the lower end of this inclined feeding belt so that it can be set at any desired distance from the floor conveyer belt to insure a regular feeding of the alfalfa between the two and have an automatic vertically disposed reciprocal movement upward from and back to the point it is set at, and while this swinging end of the belt could be supported in several different ways, we preferably carry out this feature of our invention in the following manner: To the front sides of the standards 8, are secured two sets of brackets 26^A and 27, the brackets 27 being above and considerably longer than the brackets 26^A. The outer ends of these brackets are provided with circular lug portions 28, through which apertures are formed in which rods 29 are extended from one set of brackets to the other. These rods are arranged parallel to each other, and are preferably square rods, but any flat sided form of rod may be used. The top set of brackets project out further from the standards, at an angle thereto, the angle being substantially at right angles to the inclination of the inclined belt to the floor conveyer belt. These rods are secured to the lug portions of the brackets preferably by set screws 30. The saddle 26 that supports the shaft 31 of the pulley of the lower end of the inclined feeding in belt, comprises a square yoke-shaped frame, the four corners of which are provided with projecting lug portions 32, which are provided with open guide-way slots 30^A, that fit loosely and slidably over the flat sided slide rods 29, and adjacent to the two lower lugs of the yoke on its opposite corners the yoke is provided with journal boxes 33, in which the shaft of the pulley 22^B of the belt is journaled.

To the opposite lower corner portions of the saddle are secured the ends of contraction springs 34, the opposite ends of these springs being secured to the sides of the standards 8, by bolts 35 or other suitable means. The saddle rests loosely on the flat sided rods 29 on top of the lower brackets 26^A which latter are slidably adjustable on their bolts by means of slots formed in the brackets around the bolts that allow the brackets to be moved vertically on the standards. In this manner the brackets are set to bring the discharge end of the feeding belt at the desired distance from the floor conveyer belt to permit the alfalfa to be fed evenly and regularly between and through the two belts into the chopper machine. We have found in practice, however, that in order to feed alfalfa evenly and regularly from the feeder into direct contact with the chopper arms of the chopper, we require an additional feed roller 35^A intermediate of the two feeding belts and the chopper arms, in order to carry or convey and deliver the alfalfa to the rapidly rotating chopper arms. This feature of our invention is one of great importance, as we have found in practice that the alfalfa must be fed at a certain angle to the plane of rotation of the chopper arms, or it will simply be drawn into the cage without breaking it up and pulverizing it until the alfalfa clogs up in the cage and stops the rotary movement of the choppers. We have also discovered that this roll must be positioned so that it will act in the combined capacity of a guide for the alfalfa from the feed belts to the proper point of contact with the chopper arms, and also act as a break block over which the alfalfa breaks when struck by the chopper. It accomplishes this latter feature in the following manner: It is positioned just far enough in advance of the discharge end rolls of the feed belts and just far enough in the rear of the chopper arms, so that when the alfalfa feeds over the roll its forward ends are in the striking path of the chopper arms and its rear ends are held pinched between the discharging ends of the feed belts; and so matted together that it is held at its rear end portion while its central portion lies across the combined guide and breaking roller, and the blows of the chopper arms against its forward ends into their rotative plane break it up into fine pieces over the roller, which acts as an abutment. We have found in practice that this roll should be set a little below the top surface of the conveyer belt, and at a distance from the discharging space between these two belts that will bring its top peripheral surface in alinement with a line A—A drawn through the center of the angular tapering space between the conveyer and inclined belts.

If the combined guide and breaking roller was positioned too far below the top of the conveyer belt, the alfalfa would be drawn into the cage without its being only partially broken up, and in a short time would clog the choppers, rendering it necessary to frequently stop the chopper and clean it out, and at the same time greatly reducing the capacity of the mill and increasing the cost of producing the meal, while if this combined feed and breaking roll is placed above the center of the chopper arms and above or in straight alinement with the top of the conveyer belt, it will feed the alfalfa upwardly, and as the choppers strike it they will drive it back upon itself and thus slow down and clog the feed. This combined guide and breaking roller may be journaled in boxes that are secured to the frame of the feeder, or in boxes that form a part of or are attached to the chopper and pulverizer, but as it is essential that it be positioned in a particular position relative to both the chopper arms and to the discharging ends of the belts of the feeders, we preferably illustrate it journaled to both, though it may be journaled directly to the feeder rather than to the chopper and pulverizer, which is formed to allow the roll to project into it, to lie adjacent to the choppers, when the two machines are set in operative relation to each other. We provide this roller with a shaft 36, which is journaled in boxes 37, that are preferably arranged to be bolted to either one or to both the feeder or the chopper and pulverizer frame. Our invention contemplates this combined guide and break roller positioned in a substantially horizontal plane between the discharging plane of the floor belt and the horizontal center of the rotative plane of the chopper arms, and rotatively journaled to either the chopper and pulverizer, or to the feeder, or to both, as illustrated, which arrangement holds and maintains the feed rolls, and this guide and breaking roll, and the chopper arms in operative alinement, as these two machines are run at such high speeds that we have found it necessary to secure them together to prevent them from moving out of straight alinement with each other on their foundations, which they have a tendency to do even when very firmly bolted down.

The feed belts are driven preferably at the same rate of speed, and with their alfalfa engaging faces in the same direction. We have found in practice, however, that it is necessary to regular and even feeding that the speed be uniform and in order to maintain a uniform speed while the feeder is feeding, we employ a governor 38, which is attached to the driving mechanism. Any suitable speed regulating governor may be used, and it may be either a mechanically or electrically or fluid operating governor. We have used both an electrically and mechanically operated governor, but we preferably illustrate a mechanically operating governor in connection with our feeder, and we preferably use and illustrate a friction clutch type of governor, which we construct as follows: Upon a counter shaft 39, which is journaled in boxes 40, which are secured to suitable foundation timber 41, we mount a friction cup shaped disk 42, loosely, the outside surface of which is adapted to receive a belt 43, which is connected to a source of power. To the inside of the cup portion of this disk a weighted crank arm 44, is pivoted intermediate of its ends. The weighted end is arranged to bear against the peripheral wall 45 of the inside of the cup shaped disk, and this end of the crank arm is held normally away from the wall by a spring 47, which is secured at one end to the weighted end of the crank arm, and at its opposite end is secured to the disk. A second cup shaped disk 48, is keyed to the shaft 39 at the side of the disk 42, and a split ring 49 one end of which is free fits loosely within this disk and close to its inner peripheral wall, and is adapted to expand and fit tight against its inner peripheral wall when rotated. The opposite end of this ring is pivotally secured to the free end of the crank arm. Consequently when the disk is driven by the power connected belt at the speed required, the crank arm is thrown out and expands the ring until it grips the disk 48, which being keyed to the shaft 39 rotates it. A pinion 50 is secured to this shaft, which meshes with a large gear 50$^A$ that is mounted on a shaft 51, which I term the driving shaft, which is journaled in boxes mounted on the feeder, and the speed of this shaft is reduced by this gearing to the speed desired. The floor feed belt is preferably driven from this drive shaft by a sprocket chain 52, which is mounted on a sprocket wheel 53, which is secured to the shaft of its discharge end roller, and on a sprocket wheel 54, which is secured to the drive shaft.

The combined guide and breaking roller is driven by a sprocket chain 55, which is mounted on a sprocket wheel 56 that is secured to its shaft, and on a sprocket wheel 58, that is secured to the driving shaft. The inclined feed belt is driven by a gear 59, which is mounted on the driving shaft and meshes with a gear 60, that is secured on a shaft 61, that extends across the feeder and is journaled in boxes 62. A sprocket wheel 63 is also secured to this shaft, and a sprocket chain 64 is mounted on it and extends to a sprocket wheel 65, that is secured on the shaft 23 of the upper roller 22^A of the inclined belt. The surface of this inclined belt is provided with projecting feed pins 66, which are secured to it in any suitable manner. We preferably use short elevator bolts which are inserted through the belt and are bolted to it by a nut 67, which is screwed on a washer 68, which is clamped thereby against the belt, thus bolting the belt pin securely to the bolt and leaving its end portion projecting far enough from the belt to act as feed pins as they engage the alfalfa and draw it along. The chopper arms are rotated by a power transmitting belt 69, that extends from a source of power to a pulley 70, that is mounted on the shaft 4 of the choppers.

The operation of our feeder relative to the coöperating chopper and pulverizer, is as follows: The chopper arms are rotated at about 600 revolutions per minute, and the pulleys of the feed belts and the combined feed and breaking roller rotate at about 45 revolutions per minute. Power is preferably transmitted from one source directly to the governor of the feeder through the medium of the belt 43 which runs on and drives one part of the governor, and power is preferably transmitted from another and independent source to the chopper through the medium of the belt 69. The speed that it is necessary to run the governor, is reduced by the gearing 50 and 50^A and sprocket wheels to cause the driven belt pulleys and the guide roller to rotate at preferably about 150 revolutions per minute. The alfalfa is fed into the trough of the feeder directly onto the canvas floor belt, and is conveyed by it through the trough of the feeder to the inclined belt, which forms a tapering aperture with the floor belt, into which the alfalfa feeds, and the frictional surfaces of the belts, together with the depending pins of the incline belt, engage the alfalfa and draw it forward between them, pressing it into a thin matted layer by the time it is fed to the discharge end pulleys of the belts, in which condition it feeds onto the combined guide and breaking roller, and is fed horizontally into the rotative path of the chopper arms, which rotate downward opposite the guide roller and break and pulverize the alfalfa fine enough to pass through the screen and force it through the passage in the chopper back of the screen and out through the discharge chute, from which it is either conveyed to a storage bin or discharged into sacks for shipment.

Our invention makes a simple and perfectly operating feeder for feeding alfalfa and other hays or straw to chopper machines in such a way that the choppers will run continuously without clogging and will make a fine product to their fullest pulverizing capacity.

Having described our invention, what we claim as new and desire to secure by Letters Patent, is:

1. In a machine of the character described, the combination with a chopper having a feed roll and an endless horizontal feed belt, adapted to deliver material to said roll, of an endless inclined, coöperating feed belt above the horizontal belt, slideways on the forward end of the machine, a saddle mounted on said slideways and supporting one end of the coöperating belt, and a spring for holding the saddle under resilient tension.

2. In a machine of the character described, the combination with a chopper having a feed roll, of a feeding machine comprising a suitable frame, having drums mounted at each end, the rear drum being adjustably mounted, while the forward drum is positioned adjacent to the chopper feed roll, and an endless belt on said drums; slide rods on the forward end of the frame; an automatically adjustable saddle mounted on said rods, having bearings; a drum mounted in said bearings; a drum mounted on the frame rear of the saddle and on a higher plane than the saddle drum; a belt connecting said drums; projecting pins in said belt, and means for operating said belts and the feed roll in unison.

3. In a machine of the character described, the combination with a frame and a main feed belt mounted therein, of a coöperating belt above the main feed belt inclined thereto; guide rods on the frame disposed substantially at right angles to the inclination of the coöperating belt; a saddle mounted on the slide rods, which supports the forward end of the coöperating belt, and a spring for holding the saddle under resilient tension, the forward end of the coöperating belt being in advance of the feed belt.

4. In an alfalfa feeding machine, the combination of the supporting frame provided with a pair of flat sided slide rods on one end of said frame, the endless conveyer belt in said frame, with an inclined endless belt supported at its highest end in said frame and journaled at its lower end to a vertically movable saddle, provided with open sided guide ways in its opposite sides and arranged to fit slidably on said flat sided guide rods.

5. In a machine of the character described, the combination with a main feed belt and a coöperating belt at an inclination to the main belt, of slide rods on said machine at right angles to the inclination of the coöperating belt, a saddle supporting the forward end of the coöperating belt, lugs on said saddle having guideways through which the slide rods pass, and springs which hold the forward end of the coöperating belt under resilient tension relatively to the main feed belt.

In testimony whereof we affix our signatures in presence of two witnesses.

WILLIAM T. WISE.
JAMES O. WISE.

Witnesses:
G. SARGENT ELLIOTT,
ADELLA M. FOWLE.